United States Patent
Rougnon-Glasson

[19]

[11] Patent Number: 5,881,854
[45] Date of Patent: Mar. 16, 1999

[54] MECHANISM FOR CONTROLLING A ROTARY MEMBER BY MEANS OF A PIVOTING HANDLE, AND A SEAT FITTED WITH SUCH A MECHANISM

[75] Inventor: Olivier Rougnon-Glasson, Le Bourg, France

[73] Assignee: Bertrand Faure Equipements S.A., Boulogne, France

[21] Appl. No.: 879,458

[22] Filed: Jun. 20, 1997

[30] Foreign Application Priority Data

Jun. 21, 1996 [FR] France .................................. 96 07766

[51] Int. Cl.⁶ .............................. F16D 67/02; B60N 2/02
[52] U.S. Cl. .............................. 192/15; 74/143; 74/152; 297/367; 297/284.11
[58] Field of Search ..................... 192/8 R, 7, 15, 192/16; 297/367, 284.11; 74/143, 152, 154, 155, 159

[56] References Cited

U.S. PATENT DOCUMENTS

| | | | |
|---|---|---|---|
| 1,069,881 | 8/1913 | Kellum | 74/152 |
| 2,554,990 | 5/1951 | Kilness | 192/45.1 |
| 2,804,555 | 8/1957 | Black et al. | 192/8 R |
| 3,078,973 | 2/1963 | Kilness | 192/43.2 |
| 4,648,575 | 3/1987 | Kawade | 248/371 |
| 4,805,481 | 2/1989 | Bauer et al. | 74/143 X |
| 5,590,931 | 1/1997 | Fourrey et al. | 297/367 X |
| 5,769,494 | 6/1998 | Barrere et al. | 297/367 |

FOREIGN PATENT DOCUMENTS

| | | |
|---|---|---|
| 2 717 751 | 9/1995 | France . |
| 35 25 374 A1 | 1/1986 | Germany . |
| 37 04 954 C1 | 5/1988 | Germany . |
| 37 15 726 A1 | 12/1988 | Germany . |
| 38 15 600 A1 | 11/1989 | Germany . |
| 41 23 103 A1 | 1/1993 | Germany . |

*Primary Examiner*—Richard M. Lorence
*Assistant Examiner*—Scott Lund
*Attorney, Agent, or Firm*—Marshall, O'Toole, Gerstein, Murray & Borun

[57] ABSTRACT

The mechanism is to apply drive in both directions of rotation to a ring having an inside set of teeth, the drive being applied by means of a pivoting handle. The ring cooperates with two locking pawls mounted on a stationary cheekplate and with a toothed slug pivotally mounted on a cam and forming two drive pawls, the cam being pivoted by the handle, but with a certain amount of diametral clearance. When the handle is pivoted, the drive pawl corresponding to the pivot direction engages the toothed ring while the other drive pawl is held in a retracted position by a stationary slideway, and the locking pawl corresponding to the pivot direction of the handle is moved into a retracted position by the cam while the other locking pawl engages the toothed ring.

9 Claims, 3 Drawing Sheets

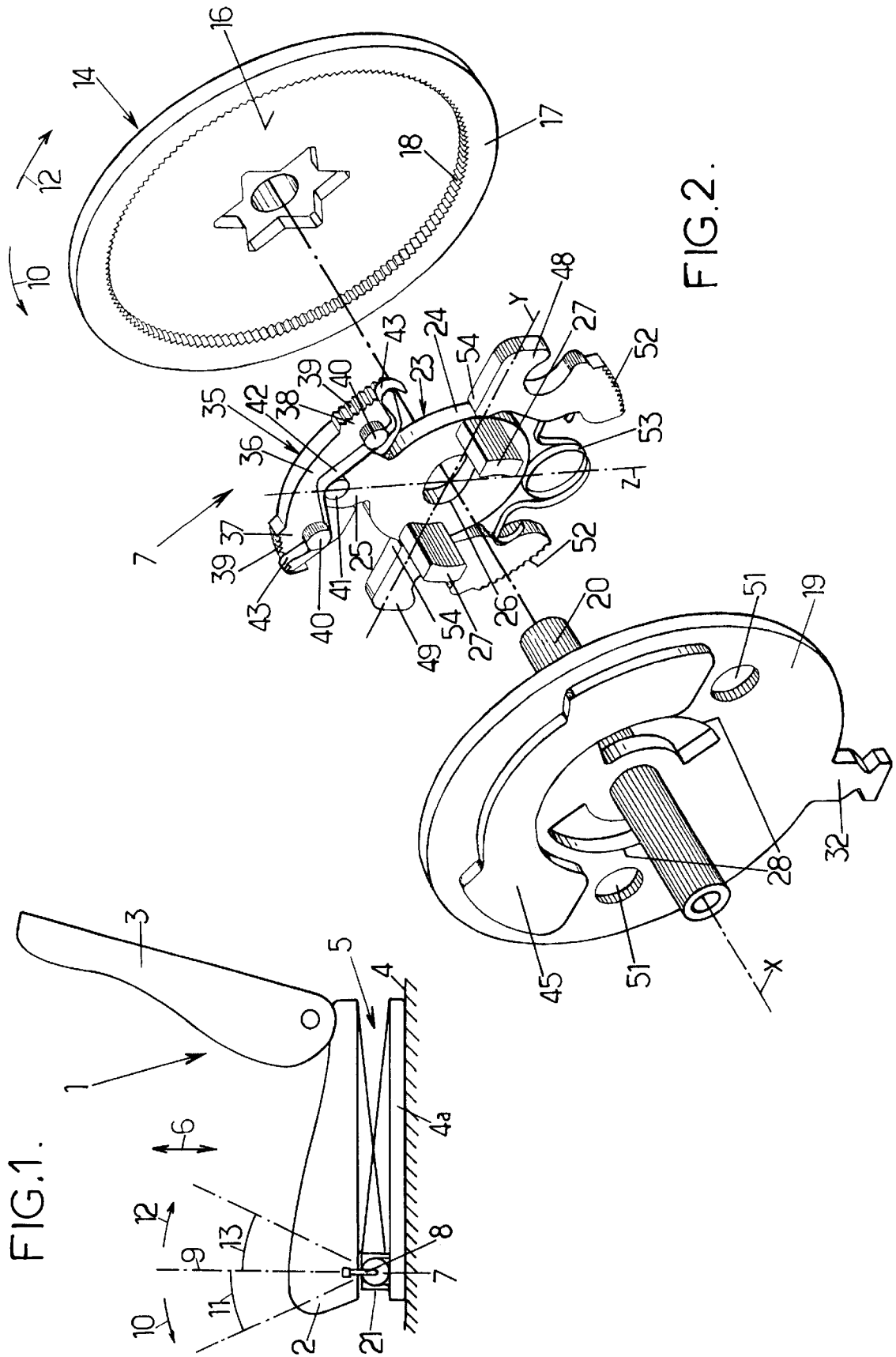

5,881,854

MECHANISM FOR CONTROLLING A ROTARY MEMBER BY MEANS OF A PIVOTING HANDLE, AND A SEAT FITTED WITH SUCH A MECHANISM

FIELD OF THE INVENTION

The invention relates to mechanisms for controlling rotary members by means of pivoting handles, and to seats fitted with such mechanisms.

More particularly, the invention relates to a control mechanism for driving an outlet member selectively in both opposite directions of rotation, by means of a handle which is pivotally mounted about an axis and which is resiliently urged towards an angular position that is neutral, said handle being displaceable in a first pivot direction over a first angular sector from its neutral position, and in a second pivot direction over a second angular sector from said neutral position, the outlet member being driven by a circular set of teeth disposed in a plane perpendicular to the pivot axis of the handle, and said teeth themselves being driven by first and second drive pawls each pivotally mounted about an axis displaceable with the handle, the first drive pawl being adapted to drive the circular set of teeth solely when the handle is displaced in the first pivot direction over the first angular sector, and the second drive pawl being adapted to drive the circular set of teeth only when the handle is displaced in the second pivot direction over the second angular sector, both drive pawls being displaceable between a respective drive position in which it co-operates with the circular set of teeth and a respective retracted position in which it does not co-operate with the circular set of teeth, and both drive pawls co-operating with a stationary support which holds the first drive pawl in its retracted position when the handle is displaced over the second angular sector and which holds the second drive pawl in its retracted position while the handle is displaced over the first angular sector.

BACKGROUND OF THE INVENTION

Such a control mechanism is disclosed, in particular, in document FR-A-2 717 751.

Those known control mechanisms give satisfaction, but they nevertheless suffer from the drawback of needing to be associated with a transmission mechanism generally referred to as a "locking mechanism", which enables torque to be transmitted from the handle to a downstream adjustment device, but not vice versa.

The locking mechanism represents non-negligible extra weight and extra cost.

OBJECTS AND SUMMARY OF THE INVENTION

A particular object of the present invention is to mitigate those drawbacks.

To this end, according to the invention, a control mechanism of the kind in question further comprises:

first and second locking pawls which are respectively pivotally mounted relative to the stationary support to pivot between respective locking positions in which they co-operate with the circular set of teeth and respective retracted positions in which they do not cooperate with said circular set of teeth, the first and second locking pawls being urged resiliently towards their respective locking positions, the first locking pawl being adapted to prevent rotation of the circular set of teeth solely in the first pivot direction and the second locking pawl being adapted to prevent rotation of the circular set of teeth solely in the second pivot direction; and camming means actuated by the handle and acting on the first and second locking pawls, said camming means being organized to displace only the first locking pawl into its retracted position when the handle is displaced over the first angular sector in the first pivot direction, and to displace only the second locking pawl into its retracted position when the handle is displaced over the second angular sector in the second pivot direction, with the camming means otherwise allowing the locking pawls to remain in their locking positions;

and both drive pawls are resiliently urged into their respective drive positions, the stationary support including at least one guide ramp which holds the first drive pawl in its retracted position and does not interfere with the second drive pawl while the handle is in the second angular sector and which holds the second drive pawl in its retracted position and does not interfere with the first drive pawl while the handle is in the first angular sector.

By means of these dispositions, the control mechanism locks itself after each occasion on which the handle is actuated, so it is no longer necessary to couple the control mechanism with an external locking mechanism.

This gives rise to a saving in the weight and a reduction in the cost price of the mechanical assembly fitted with the control mechanism.

In preferred embodiments, use may optionally also be made of one or more of the following dispositions:

the circular set of teeth is formed inside a rigid ring, the above-mentioned stationary support being constituted by a stationary cheekplate which extends substantially in a plane perpendicular to the pivot axis of the handle and which is disposed against the ring cooperating therewith to define at least in part a housing that contains at least the two drive pawls and the two locking pawls;

the camming means are constituted by a single cam in the form of a rigid plate extending in a plane perpendicular to the pivot axis of the handle, said cam being constrained to pivot with the handle about the pivot axis of said handle, while presenting a certain amount of clearance relative to the handle and to the ring along a transverse axis which, at least in the neutral angular position of the handle, intersects the pivot axis of said handle and is perpendicular to said pivot axis, the pivot axis of each drive pawl being secured to the cam, and being situated in a position remote from the transverse axis in the vicinity of a middle axis which, at least in the neutral angular position of the handle, intersects the pivot axis of said handle and is perpendicular to said pivot axis and to the transverse axis, the cam further having a substantially circular edge which co-operates with two actuator levers respectively belonging to the two locking pawls, the cam being adapted to pivot about the pivot axis of each of the drive pawls when the handle is actuated, by moving substantially along the transverse axis so as to act on one or the other of the actuator levers of the locking pawls to displace the corresponding one of the locking pawls into its retracted positions;

the cam has an oblong hole extending longitudinally in the transverse direction and receiving a pivot centered on the pivot axis of the handle;

the cam includes two drive fingers which are disposed on either side of the pivot axis of the handle along the transverse axis of the cam, each of said drive fingers extending parallel to the pivot axis of the handle and penetrating in guide slots secured to the handle, with a certain amount of clearance on the transverse axis;

each drive finger passes with a certain amount of radial clearance through a circularly-arcuate slot formed in the stationary cheekplate and centered on the pivot axis of the handle, thereby defining two angular abutment positions for the handle;

the two drive pawls belong to a single rigid part referred to below as a drive "slug" having a central portion mounted on a pivot secured to the cam, the drive slug extending on either side of said central portion towards two toothed ends forming the two drive pawls, the mechanism further including a flexion spring having a central portion bearing against the outside of a portion of said pivot secured to the cam, with the central portion of the flexion spring being extended on either side of said pivot by two lateral branches each of which bears against a peg secured to a respective end of the drive slug, urging said end radially outwards;

the pivot secured to the cam is a partially circular flat head, formed on the periphery of the cam; and the stationary cheekplate includes a guide ramp extending radially inwards and against which there bear first and second slide shoes formed by the two lateral branches of the flexion spring respectively at the first and second drive pawls, said guide ramp presenting firstly a circularly-arcuate central portion centered on the pivot axis of the handle, and secondly two notched lateral portions on either side of the central portion and further away than said central portion from the pivot axis of the handle, the first slide shoe being placed in correspondence with one of the notched side portions while the second slide shoe is placed in correspondence with the central portion of the guide ramp when the handle is displaced over the first angular sector, only the first drive pawl then engaging the set of teeth, and the first slide shoe being placed facing the central portion of the guide ramp when the second slide shoe is placed in correspondence with the other notched lateral portion when the handle is moved over the second angular sector, only the second drive pawl then engaging the circular set of teeth.

The invention also provides a vehicle seat including a device for raising the seat proper and driven by a control mechanism as defined above.

BRIEF DESCRIPTION OF THE DRAWINGS

Other characteristics and advantages of the invention appear from the following detailed description of an embodiment thereof given by way of non-limiting example, and described with reference to the accompanying drawings.

In the drawings:

FIG. 1 is a diagrammatic view of a vehicle seat in which the height of the seat proper is adjusted by means of a control mechanism constituting an embodiment of the invention;

FIGS. 2 and 3 are exploded fragmentary views of the control mechanism used for adjusting the height of the seat in FIG. 1;

MORE DETAILED DESCRIPTION

Figure 3:
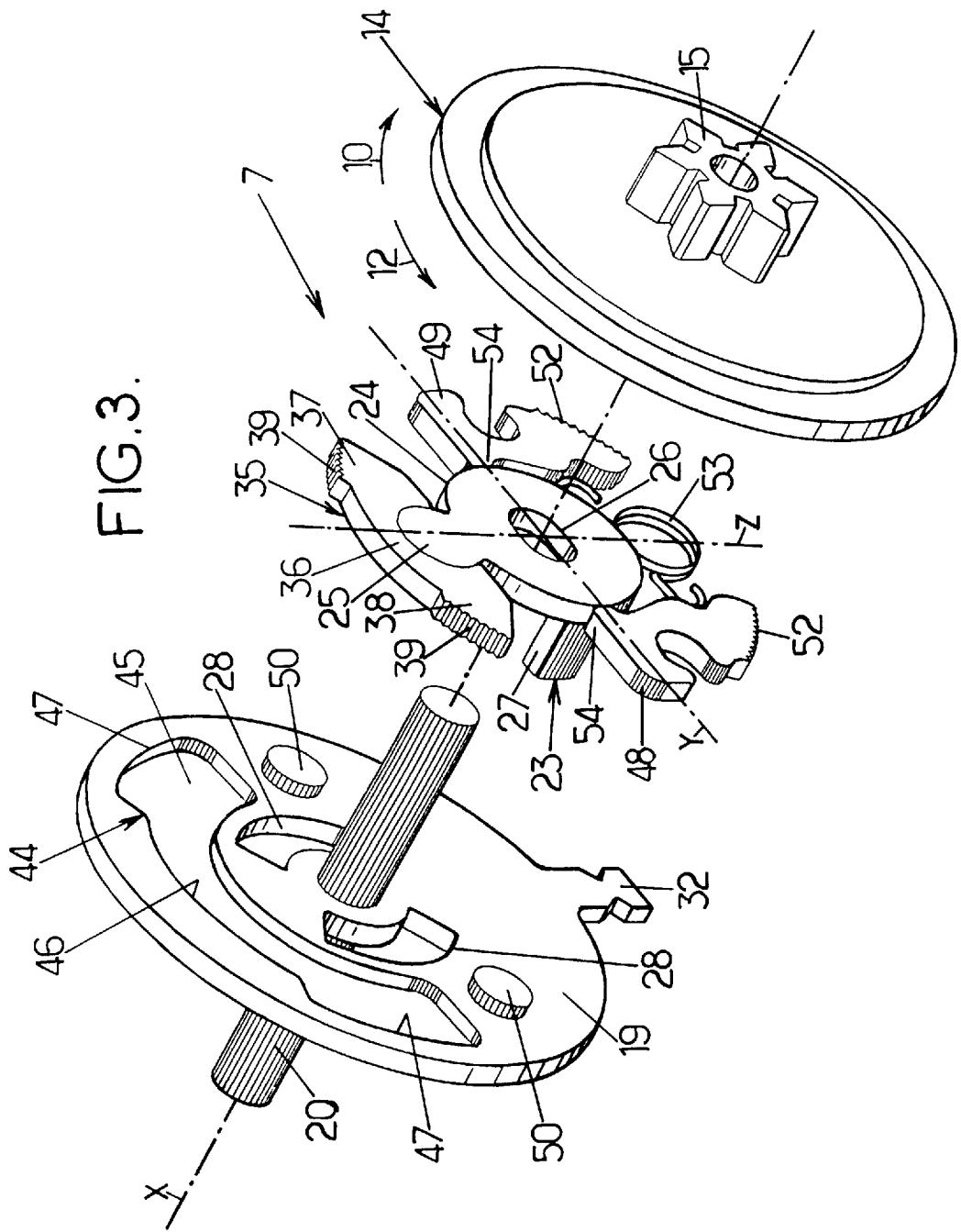

FIG. 1 shows a front seat 1 of a motor vehicle, which seat comprises firstly a seat proper 2 mounted on sideways 4a themselves fixed to the floor 4 of the vehicle, and secondly a back 3 mounted on the seat proper.

The seat 2 is mounted on the sideways 4a via a conventional seat-raising mechanism 5, e.g. a linkage, enabling the entire seat to be moved vertically in the directions of double-headed arrow 6, and under the control of a control mechanism 7 provided with a handle 8.

As explained in greater detail below, the handle 8 is resiliently urged towards a neutral angular position 9, and the handle can be pivoted about a transverse horizontal pivot axis to drive the lifting mechanism 5.

More precisely:

to move the seat 2 vertically in a given direction, e.g. downwards, the handle 8 is pivoted in a first direction 10 from the neutral position 9 over a first angular sector 11, and where appropriate, this movement is repeated several times until the seat is adjusted to the desired height; and to move the seat 2 vertically in the opposite direction, i.e. upwards in the example under consideration, the handle 8 is pivoted in a second pivot direction 12 from the neutral position 9, i.e. in the direction opposite to the first direction 10, and over a second angular sector 13 that is substantially symmetrical to the first sector 11 relative to said neutral position 9, and where appropriate, this movement is repeated several times until the position of the seat is adjusted to the desired height.

Figure 4:
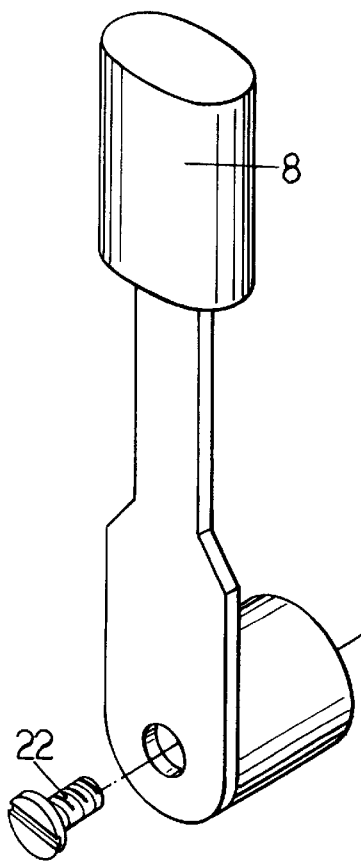
FIG. 4 is an exploded view of the handle of the mechanism of FIGS. 2 and 3.

As shown in greater detail in FIGS. 2 to 4, the control mechanism 7 presents on the outside:

a moving metal cheekplate 14 which extends in a plane perpendicular to the pivot axis X of the handle and which has a circular outline centered on said axis X, this moving cheekplate having, on one face, a gear wheel 15 centered on the axis X and meshing with complementary teeth (not shown) belonging to the lifting mechanism 5, and on its other face the moving cheekplate 14 forms a dish 16 defined externally by a ring 17 fitted with a circular set of inwardly directed teeth 18 centered on the pivot axis X;

a stationary metal cheekplate 19 which extends parallel to the moving cheekplate 14 and which bears against the ring 17 so as to co-operate with the moving cheekplate 14 to form a closed box; and a circular section shaft 20 which extends along the pivot axis X of the handle and which passes through both cheekplates 14 and 19.

In the example under consideration, the shaft 20 is secured to the stationary cheekplate 19, e.g. by welding, by engagement of a portion of the shaft 20 that is not entirely circular in a hole of complementary shape in the stationary cheekplate 19, or by any other means.

In addition, said shaft 20 is secured to a rigid support 21 (FIG. 1) which may itself be secured, for example, to the moving portion of one of the seat-supporting slideways 4a, with the handle 8 being engaged in one end of the shaft and being held at said end of the shaft by means of a screw 22 or by any other fastener means.

Inside the dish 16 formed by the moving cheekplate 14 there is disposed a cam 23 which is in the form of a rigid metal plate lying in a plane perpendicular to the pivot axis X of the handle.

The cam 23 has a circular edge 24 which is substantially centered on the axis X when the handle is in its neutral position. This circular edge is extended radially outwards by a flat head 25 that is also circular that is disposed symmetrically about a middle axis Z perpendicular to the axis X, and that intersects said axis X when the handle is in its neutral position.

In addition, the cam 24 is pierced by an oblong hole 26 which extends longitudinally along a transverse axis Y perpendicular to both above-mentioned axes X and Z, said oblong hole allowing the shaft 20 to pass therethrough with a certain amount of clearance on the axis Y.

Finally, the cam 23 also includes two drive fingers 27 disposed symmetrically on either side of the oblong hole 26 and aligned side-by-side on the transverse axis Y.

These drive fingers 27 extend parallel to the axis X and pass with a certain amount of radial clearance through two circularly-arcuate slots 28 formed in the stationary cheekplate 19 and centered on the axis X, said slots defining two angular abutment positions for the cam 23.

In addition, the handle 8 is secured by welding, by interfitting engagement, or by any other known means, with a rigid metal plate 29 having the shaft 20 passing therethrough and including two radial slots 30 in which the drive fingers 27 are received with radial clearance.

The plate 29 is extended radially by a finger 31 which, when the handle 8 is in its neutral position, is in alignment with a radial finger 32 formed at the periphery of the stationary cheekplate 19. The two fingers 31 and 32 are disposed between two tabs 33 on a spiral spring 34 disposed around the shaft 20 and generally fixed to the stationary cheekplate 19; the spring 34 thus urges the handle 8 towards its neutral position.

In addition, the mechanism also includes a toothed metal slug 35 having a central portion 36 provided with a circular recess engaged on the round head 25 of the cam, enabling said slug 35 to pivot on the head 25.

On either side of the central portion 36, the toothed slug 35 extends towards two ends 37 and 38 each having outside teeth 39 capable of meshing with the inside teeth 18 of the ring 17.

The ends 37 and 38 of the slug 35 thus respectively constitute first and second drive pawls, the first drive pawl 37 being suitable for driving the teeth 18 in the first pivot direction 10 by a non-return effect but being incapable of driving the teeth 18 in the second pivot direction 12, while the second drive pawl 38 is capable of driving the teeth 18 in the second pivot direction 12 by a non-return effect, but is incapable of driving said teeth in the first pivot direction 10.

Each of the ends 37 and 38 of the slug 35 is provided with a peg 40 extending towards the stationary cheekplate 19, and the round head 25 belonging to the cam itself includes a peg 41 which extends towards the stationary cheekplate 19.

A resilient metal blade 42, constituting a flexion spring has a central portion which bears radially on the outside of the peg 41, and two lateral branches which bear radially on the insides of the pegs 40, thereby urging said pegs 40 radially outwards.

The resilient metal blade 42 has two folded-over ends 43 which bear against a radially outer edge 44 of a stamping 45 formed in the stationary cheekplate 19 and receiving the pegs 40 and 41, together with the resilient metal blade 42.

The edge 44 includes a circularly-arcuate central portion 46 centered on the axis X, said central portion 46 lying between two notched side portions 47, that are likewise circularly-arcuate and centered on the axis X, but that are of radius that is larger than the central portion 46.

The edge 44 is shaped in such a manner that both of the folded-over ends 43 of the resilient metal blade bear against the central portion 46 of the edge 44 when the handle is in its neutral position, and that one of said two folded-over ends 43 is moved facing one of the lateral portions 47 of the edge 44 whenever the handle 8 is moved from its neutral position, thereby making it possible under drive from the resilient metal blade 48 for the corresponding drive pawl to come into a drive position where it engages with the teeth 18 while the other drive pawl remains held in a retracted position where it does not co-operate with the teeth 18.

Finally, first and second metal locking pawls 48 and 49 are disposed on either side of the cam 23, substantially symmetrically about the middle axis Z.

Each of the locking pawls 48 and 49 is mounted on a respective pivot 50, e.g. constituted by a stamping 51 in the stationary cheekplate 19, and each of these locking pawls is displaceable between a locking position in which the outside teeth 52 of the pawl mesh with the inside teeth 18, and a retracted position in which the teeth 52 do not co-operate with the teeth 18.

In addition, the first locking pawl 48 is disposed so as to be capable of preventing the teeth 18 from moving only in the first pivot direction 10 by means of a non-return effect, but so as to be incapable of preventing them from moving in the second pivot direction 12, while the second locking pawl 49 is disposed so as to be capable of preventing the teeth 18 from moving solely in the second pivot direction 12 by means of a non-return effect, but so as to be incapable of preventing them from moving in the first pivot direction 10.

Between the two locking pawls 48 and 49, there is disposed a spring 53 which urges the pawls into their locking positions, and each of the pawls also includes an actuator arm 54 whose end bears against the circular edge 24 of the cam, in the vicinity of one of its drive fingers 27.

Figure 5:
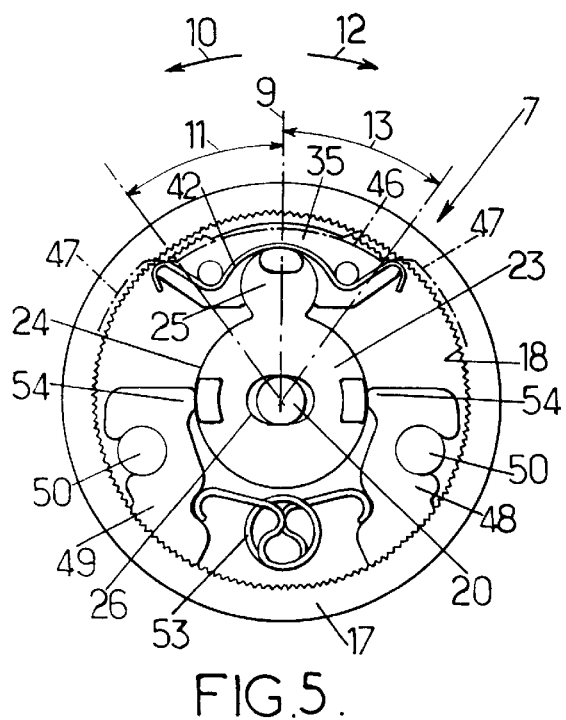
FIGS. 5 and 6 are diagrammatic views showing the operation of the control mechanism of FIGS. 2 to 4, respectively at rest and while in operation.

Thus, as shown in FIG. 5, so long as the handle 8 is in its neutral position, the spring 53 holds both locking pawls 48 and 49 in their locking positions, and the actuator arms 54 of the two pawls in turn hold the cam 24 in a position that is substantially centered relative to the shaft 20.

Figure 6:
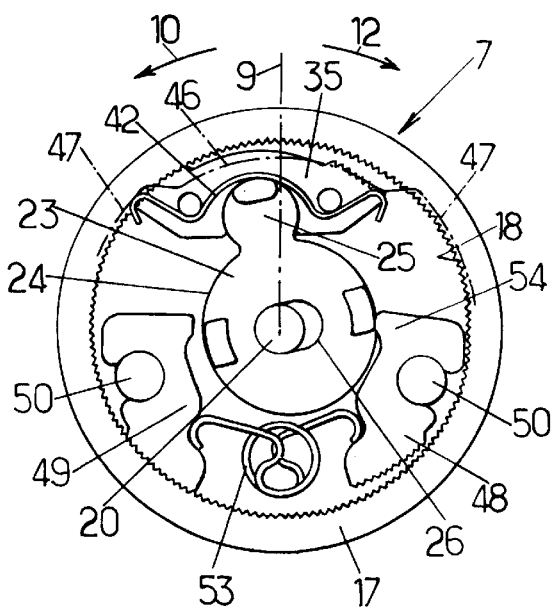

In contrast, as soon as a user actuates the handle 8, e.g. in the first pivot direction 10, as shown in FIG. 6, the toothed slug 35 engages the teeth 18, in this case via the first drive pawl 37, such that during a fraction of a second, of which the user is substantially unaware, the handle and the cam 23 are both locked since the teeth 18 are initially locked by both locking pawls 49 and 50.

The result of this small amount of locking is to cause the cam 23 to pivot about the head 25, thereby giving rise to relative displacement between the shaft 20 and the oblong hole 26 in the cam.

This movement of the cam 23 causes the circular edge 24 of the cam to bear against the actuator arm 54 of one of the locking pawls, in this case the first locking pawl 48, such that the locking pawl is moved into its retracted position while the other locking pawl remains in its locking position.

The handle 8 can thus continue to pivot in the first pivot direction 10, driving the toothed ring 18 under the effect of the first drive pawl 37 belonging to the slug 35. Rotation of the teeth 18 is accompanied by successive release movements of the second locking pawl 49 as it moves past the teeth 18.

As soon as the user release the handle 8, the first locking pawl 48 is returned to its locking position by the spring 53, thereby also returning the cam 24 to a centered position relative to the axis X, and the handle 8 is returned to its neutral position by the spring 34. The first drive pawl 37 is subjected during this return movement to a sequence of escape movements as it moves past the teeth 18.

Actuating the handle 8 in the other pivot direction 12 starting from the neutral position is similar to actuating it in the direction described above, and is therefore not described again in detail herein.

Naturally, and as can be seen from the above, the invention is not limited to the particular embodiment described above; on the contrary, the invention extends to any variant, and in particular variants in which:

the toothed slug 35 is replaced by two separate drive pawls pivotally mounted relative to the cam 23 in the vicinity of the middle axis Z and in the vicinity of the edge of said cam;

the slots 30 are formed in the cam 24 and the fingers 27 are secured to the handle 8; and the plate 29 and the handle 8 are integrally formed as a single piece.

I claim:

1. A control mechanism for driving an outlet member selectively in both opposite directions of rotation, by means of a handle which is pivotally mounted about a pivot axis and which is resiliently urged towards an angular position that is neutral, said handle being displaceable in a first pivot direction over a first angular sector from its neutral position, and in a second pivot direction over a second angular sector from said neutral position, the outlet member being driven by a circular set of teeth disposed in a plane perpendicular to the pivot axis of the handle, and said teeth themselves being driven by first and second drive pawls each pivotally mounted about an axis displaceable with the handle, the first drive pawl being adapted to drive the circular set of teeth solely when the handle is displaced in the first pivot direction over the first angular sector, and the second drive pawl being adapted to drive the circular set of teeth only when the handle is displaced in the second pivot direction over the second angular sector, both drive pawls being displaceable between a respective drive position in which it co-operates with the circular set of teeth and a respective retracted position in which it does not co-operate with the circular set of teeth, and both drive pawls co-operating with a stationary support which holds the first drive pawl in its retracted position when the handle is displaced over the second angular sector and which holds the second drive pawl in its retracted position when the handle is displaced over the second angular sector and which holds the second drive pawl in its retracted position while the handle is displaced over the first angular sector, wherein said mechanism further comprises:

first and second locking pawls which are respectively pivotally mounted relative to the stationary support to pivot between respective locking positions in which they co-operate with the circular set of teeth and respective retracted positions in which they do not co-operate with said circular set of teeth, the first and second locking pawls being urged resiliently towards their respective locking positions, the first locking pawl being adapted to prevent rotation of the circular set of teeth solely in the first pivot direction and the second locking pawl being adapted to prevent rotation of the circular set of teeth solely in the second pivot direction; and a camming means actuated by the handle and acting on the first and second locking pawls, said camming means being organized to displace only the first locking pawl into its retracted position when the handle is displaced over the first angular sector in the first pivot direction, and to displace only the second locking pawl into its retracted position when the handle is displaced over the second angular sector in the second pivot direction, with the camming means otherwise allowing the locking paws to remain in their locking positions;

the circular set of teeth formed inside a rigid ring, where the stationary support is constituted by a stationary cheekplate which extends substantially in a plane perpendicular to the pivot axis of the handle and which is disposed against the ring cooperating therewith to define at least in part a housing that contains at least the two drive pawls and the two locking pawls;

and wherein both drive pawls are resiliently urged into their respective drive positions, the stationary support including at least one guide ramp which holds the first drive pawl in its retracted position and does not interfere with the second drive pawl while the handle is in the second angular sector and which holds the second drive pawl in its retracted position and does not interfere with the first drive pawl while the handle is in the first angular sector.

2. A vehicle seat including a seat proper mounted on a raising device driven by the control mechanism according to claim 1.

3. A control mechanism according to claim 1, in which the camming means are constituted by a single cam in the form of a rigid plate extending in a plane perpendicular to the pivot axis of the handle, said cam being constrained to pivot with the handle about the pivot axis of said handle, while presenting a certain amount of clearance relative to the handle and to the ring along a transverse axis which, at least in the neutral angular position of the handle, intersects the pivot axis of said handle and is perpendicular to said pivot axis, the pivot axis of each drive pawl being secured to the cam, and being situated in a position remote from the transverse axis in the vicinity of a middle axis which, at least in the neutral angular position of the handle, intersects the pivot axis of said handle and is perpendicular to said pivot axis and to the transverse axis, the cam further having a substantially circular edge which co-operates with two actuator levers respectively belonging to the two locking pawls, the cam being adapted to pivot about the pivot axis of each of the drive pawls when the handle is actuated, by moving substantially along the transverse axis so as to act on one or the other of the actuator levers of the locking pawls to displace a corresponding one of the locking pawls into its retracted positions.

4. A control mechanism according to claim 3, in which the cam has an oblong hole extending longitudinally in the transverse axis and receiving a pivot centered on the pivot axis of the handle.

5. A control mechanism according to claim 3, in which the cam includes two drive fingers which are disposed on either side of the pivot axis of the handle along the transverse axis of the cam, each of said drive fingers extending parallel to the pivot axis of the handle and penetrating in guide slots secured to the handle, with a certain amount of clearance on the transverse axis.

6. A control mechanism according to claim 5, in which each drive finger passes with a certain amount of radial clearance through a circularly-arcuate slot formed in the stationary cheekplate and centered on the pivot axis of the handle, thereby defining two angular abutment positions for the handle.

7. A control mechanism according to claim 3, in which the two drive pawls belong to a single rigid part defining a drive slug having a central portion mounted on a pivot secured to the cam, the drive slug extending on either side of said central portion towards two toothed ends forming the two drive pawls, the mechanism further including a flexion spring having a central portion bearing against an outside portion of said pivot secured to the cam, with the central portion of the flexion spring being extended on either side of said pivot by two lateral branches each of which bears against a peg secured to a respective end of the drive slug, urging said end radially outwards.

8. A control mechanism according to claim 7, in which the cam has a periphery and the pivot secured to the cam is a partially circular flat head, formed on the periphery of the cam.

9. A control mechanism according to claim 7, in which the stationary cheekplate includes a guide portion extending radially inwards and against which there bear first and second slide shoes formed by the two lateral branches of the flexion spring respectively at the first and second drive pawls, said guide portion presenting firstly a circularly-arcuate central portion centered on the pivot axis of the handle, and secondly two notched lateral portions on either side of the central portion of said guide portion and further away than said central portion of said guide portion from the pivot axis of the handle, the first slide shoe being placed in correspondence with one of the notched lateral portions while the second slide shoe is placed in correspondence with the central portion of the guide ramp when the handle is displaced over the first angular sector, only the first drive pawl then engaging the set of teeth, and the first slide shoe being placed facing the central portion of the guide ramp when the second slide shoe is placed in correspondence with the other notched lateral portion when the handle is moved over the second angular sector, only the second drive pawl then engaging the circular set of teeth.

* * * * *